United States Patent [19]

Snyder

[11] Patent Number: 4,611,624
[45] Date of Patent: Sep. 16, 1986

[54] LINE PIERCING VALVE ASSEMBLY

[75] Inventor: Benjamin L. Snyder, N. Miami Beach, Fla.

[73] Assignee: Watsco, Inc., Hialeah, Fla.

[21] Appl. No.: 775,342

[22] Filed: Sep. 12, 1985

[51] Int. Cl.[4] ............................................. F16K 43/00
[52] U.S. Cl. .................................... 137/318; 222/83; 285/197
[58] Field of Search ............ 137/231, 232, 233, 234.5, 137/315, 317, 318; 285/197, 198, 199; 222/83

[56] References Cited

U.S. PATENT DOCUMENTS

| | | | |
|---|---|---|---|
| 499,956 | 6/1893 | Berry | 137/232 |
| 1,226,608 | 5/1917 | Lines | 137/232 |
| 3,240,226 | 3/1966 | Burkholder | 137/318 |
| 3,428,075 | 2/1969 | Wagner | 137/318 |
| 4,018,246 | 4/1977 | Langstroth | 137/318 |
| 4,204,559 | 5/1980 | Wagner | 137/318 |
| 4,216,793 | 8/1980 | Volgstadt et al. | 137/318 |

*Primary Examiner*—George L. Walton
*Attorney, Agent, or Firm*—Ernest H. Schmidt

[57] ABSTRACT

A line piercing valve assembly has a transverse cylindrical bore for the reception of a length of tubing to be pierced and an interior recess open to the outside disposed within which is a piercing needle and valve member depressable into the bore for flow communication with the pierced or tapped line, the piercing needle and valve member normally being spring urged away from the length of tubing into sealing contact with a valve seat. A depressor pin is removeably attached to the upper end of the piercing needle and valve member for depressing it sufficiently to pierce the tubing upon screw-threading advancement of an internally-threaded cap enclosing the open end of the interior recess, the interior bottom wall of the cap abuttingly engaging the outer end of the pin for this purpose. An "O" ring seated within an annular recess concentric with and open into the cylindrical bore seals against leakage of the tubing pierced.

1 Claim, 9 Drawing Figures

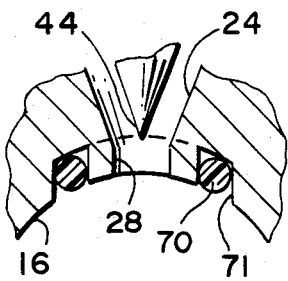
FIG.4a
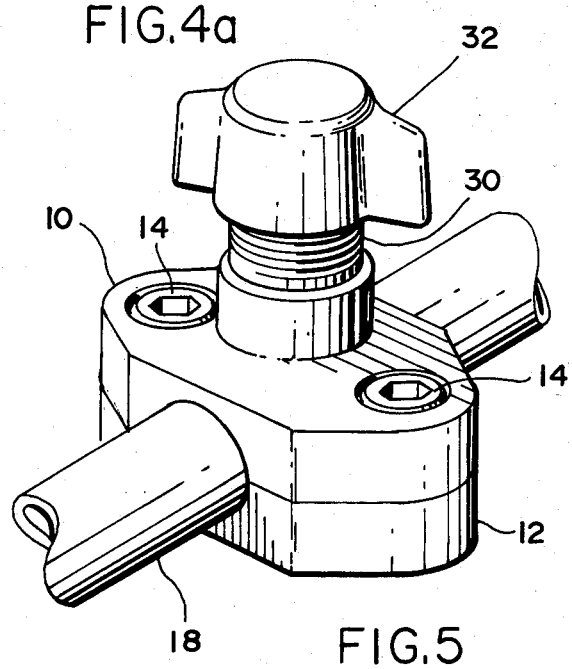
FIG.5
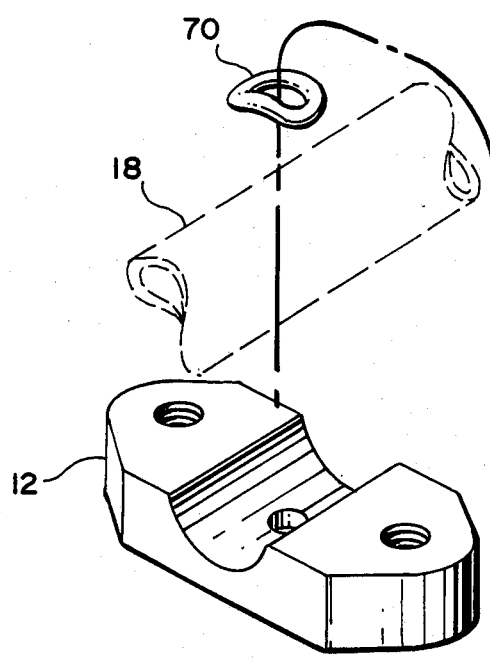
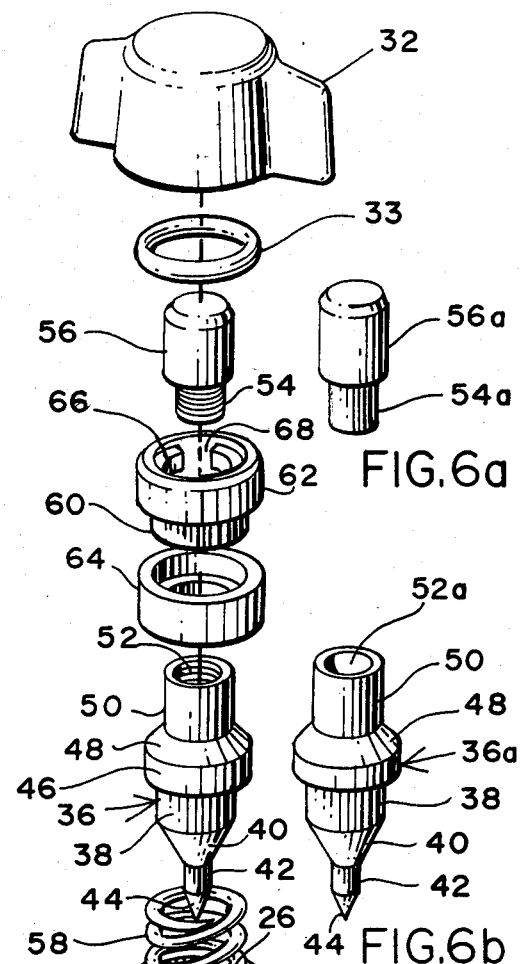
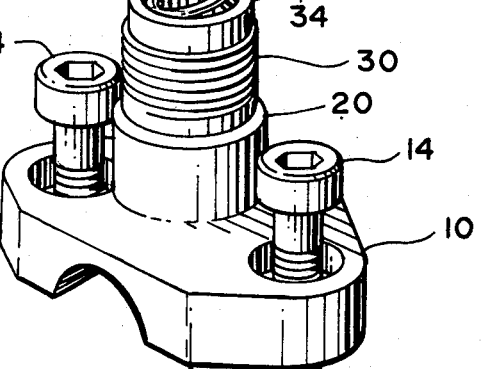
FIG.6a
FIG.6b
FIG.6

LINE PIERCING VALVE ASSEMBLY

This invention is directed to improvements in line piercing valve assemblies for permanent installation on pressure lines or tubing. Such line piercing valves have particular application in tapping the inter-connecting circulating refrigerant lines or tubing of refrigeration systems, which must function at relatively precise and constant pressures. It is necessary to determine refrigerant pressures at different stages of the system at periodic intervals, and occasionally recharge the system. To accommodate such needs, line piercing valve assemblies which may be permanently placed at desired locations on pressure system lines have heretofore been devised. U.S. Pat. No. 3,428,075, issued February 18, 1969 to William Wagner illustrates and describes, by way of example, such a line piercing valve heretofore known. In the Wagner patent, a depressor pin is removeably inserted into the top of a piercing needle enclosure for depressing the needle and piercing the line or length of tubing to be tapped upon the screw-threading in place of the cap, the inside of which cap abuts the outer end of the depressor pin to provide for its piercing advancement into the length of tubing. This method of line piercing is deficient in that the depressor pin, when applied for a piercing operation, is screw-fitted within the cap to extend outwardly in coaxial relation. Since the length of the pin is such that it extends substantially short of the open end of the cap, and since the parts are quite small, assembly and removal of the depressor pin is difficult, even with the use of hand tools. Unless precision machined, moreover, precise coaxial alignment of the depressor pin within the screw cap cannot easily be achieved, which occasionally results in undesired lateral displacement at the zone of abutment with the head of the depressor pin upon application of the high screw-threading forces on the cap necessary to pierce the tubing. It is, accordingly, the principal object of this invention to provide a novel and improved depressor pin mechanism that obviates the above described deficiencies.

A more particular object of the invention is to provide a depressor pin that is removeably attachable to the outer end of the piercing needle assembly for precise coaxial alignment therewith, whereby upon the screw-threading of the cap in place, the upper end of the depressor pin is constrained within an abutment wall recess within the cap to prevent any substantial axial displacement during a piercing operation.

Another object of the invention is to provide, in a line piercing valve assembly of the character described, gasket means in the form of an "O" ring seated within an annular recess concentric with and open into the cylindrical bore embracing a length of tubing to be pierced for dependable sealing against leakage of pressurized gas or other fluid.

Other objects, features and advantages of the invention will be apparent from the following description when read with reference to the accompanying drawings.

BRIEF DESCRIPTION OF THE DRAWINGS

In the drawings, wherein like reference numeral denote corresponding parts in each of the several views:

FIG. 4a is an enlarged fragmentary portion of FIG. 4, in vertical cross-section, illustrating details of the "O"-ring seal against a length of tubing to be clamped in place for piercing;

FIG. 5 is an oblique view of the line piercing valve shown secured in place along a conduit to be tapped, the closure cap being in place;

FIG. 6 is an "exploded view" of the valve assembly illustrated in FIG. 5, showing constructional details; and FIGS. 6a and 6b illustrate a modified form of the depressor pin.

Figure 1:
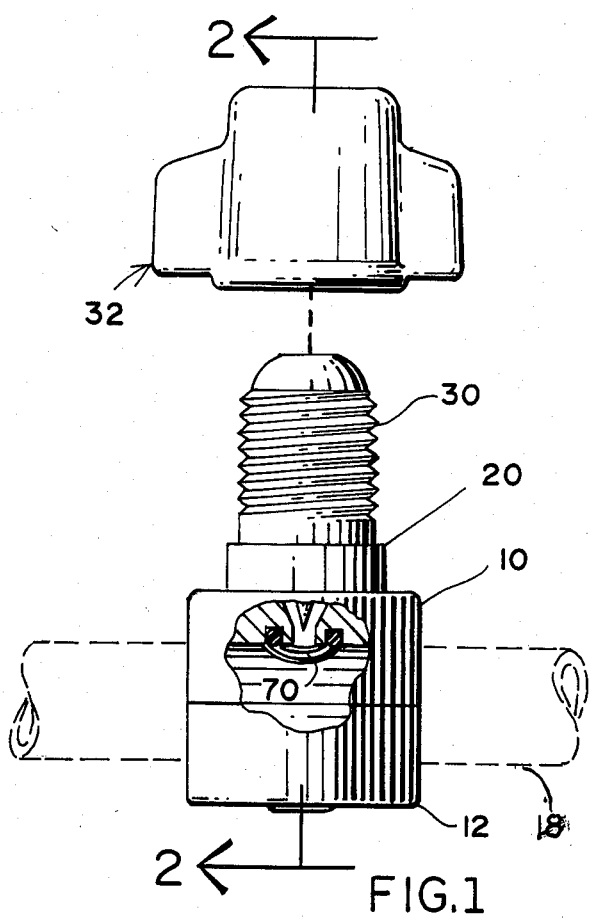
FIG. 1 is a side elevational view of a line piercing valve assembly embodying the invention, with portions broken away to reveal constructional details, and further illustrating the cap removed and above the valve assembly.

Referring now in detail to the drawings, the valve assembly comprises an upper housing 10 and a lower housing 12, secured to one another by machine screws 14, which threadingly engage lower housing 12. Preferably, as best illustrated in FIGS. 5 and 6, bolts 14 have Allen wrench socket heads which, upon assembly, are received within counter-sunk recesses within the upper housing 10. Upper housing 10 and lower housing 12, when bolted together, define a transverse, cylindrical bore 16 between them, the upper half of which is in upper housing 10 and the lower half of which is in lower housing 12. Bore 16 is of such diameter as to firmly embrace a standard size of tubing to be tapped; that is, upper and lower housings 10 and 12 can be tightly clamped in any desired location along a length of tubing 18 to be securely held in bore 16.

Upper housing 10 is integrally formed with a central, cylindrical projection 20. The central cylindrical projection 20 is formed along its length with a concentric, interior, cylindrical recess 22, the lower end of which merges with a concentric, reduced-diameter frusto-conical valve seat 24. The outer end of the valve seat 24 opens into the cylindrical bore portion 16 in the upper housing 10 through a reduced-diameter cylindrical portion 28. The upper or outer end of the cylindrical recess 22 merges with a comparatively short, concentric cylindrical recess 26 of slightly greater diameter. The central cylindrical projection 20 is externally threaded, as indicated at 30, to receive a thumb-screw cap 32, in the manner and for the purpose hereinafter more particularly described.

Figure 2:
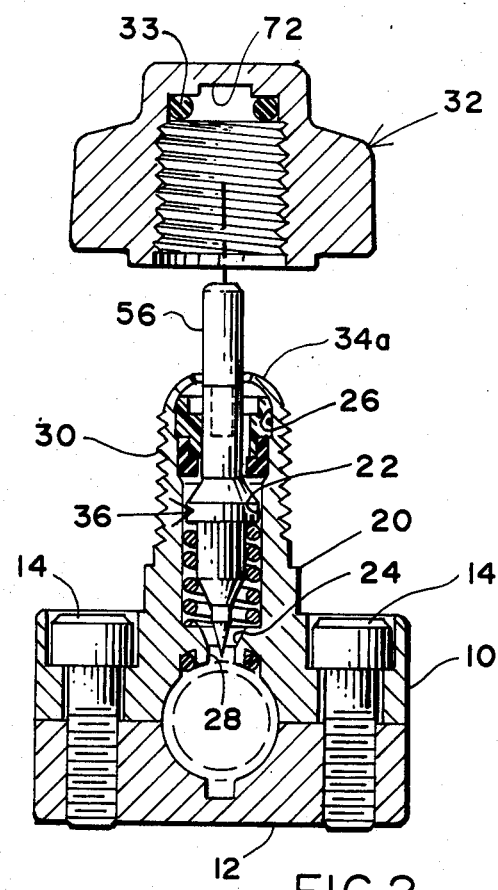
FIG. 2 is a vertical cross-sectional view taken along the line 2—2 of FIG. 1 in the direction of the arrows.

At its outer end, the external diameter of central cylindrical projection 20 is reduced to provide for an unthreaded, thin-wall section 34 (See FIG. 6) that can be turned over, as indicated at 34a in FIG. 2, to retain in place the piercing needle and valve member 36, now to be described, coaxially received within the said cylindrical projection for controlled coaxial movement therein.

As best illustrated in FIG. 6, the piercing needle and valve member 36 is of symmetrical shape about its longitudinal axis and comprises a cylindrical body portion 38, the lower end of which merges with a frusto-conical valve head portion 40 which, in turn, extends into a reduced-diameter piercing needle portion 42 terminating in a sharp conical point 44. The upper end of the cylindrical body portion 38 merges with a comparatively short, increased-diameter cylindrical portion 46, the upper end of which merges with a frusto-conical, annular valve portion 48 terminating in a reduced-diameter, cylindrical upper end portion 50. The upper end portion 50 is internally-threaded as indicated at 52, to receive the threaded lower end portion 54 of a cylindrical depressor pin 56.

Upon assembly, there is circumjacently received on the cylindrical body portion 38 of the piercing needle and valve member 36, a helical compression spring 58, which is constrained between the shoulder under the frusto-conical annular valve portion 48 and the annular seat at the lower end of the interior cylindrical recess 22 of the central cylindrical projection 20. The helical compression spring 58 serves to maintain piercing needle and valve member 36 in axially withdrawn position within the interior cylindrical recess 22.

Means is provided for limiting the upward or outward movement of the piercing needle and valve member 36 as urged by compression spring 58, while at the same time closing a valve seat to prevent the escape of gas under pressure from a length of tubing pierced. To this end, there is snugly received within the cylindrical recess 26 a natural or synthetic rubber, annular valve seat 64, said valve seat being circumjacent cylindrical upper end portion 50 of the piercing needle and valve member 36 and having an internal diameter that is substantially greater than the outer diameter of said upper portion. Fitted at the upper end of the annular valve seat 64 is a cylindrical cap 62 of the same outer diameter, said cap preferably being fabricated of a synthetic plastic material and having at its lower end a reduced outer diameter portion 60 which is interfittingly received within the upper end of the annular valve seat 64, but which extends short of the lower end thereof. The cap 62 is provided with a central opening 66 for sliding reception on the upper end portion 50 of the piercing needle and valve member 36. The central opening 66 has four internal, rectangular longitudinal slots 68, circularly spaced 90 degrees from one another, to provide for the free passage of gas under pressure, as is hereinbelow more particularly described. The valve seat 64 and cap 62 will preferably be fabricated by injection molding of the cap to the prefabricated valve seat for unitary construction.

As illustrated in FIG. 2, the piercing needed and valve member assembly is retained in place by turning over or spinning the thin-wall section 34 of the central cylindrical projection 20, shown before spinning in FIG. 6 and as illustrated after the spinning at 34a in FIG. 2.

Figure 4:
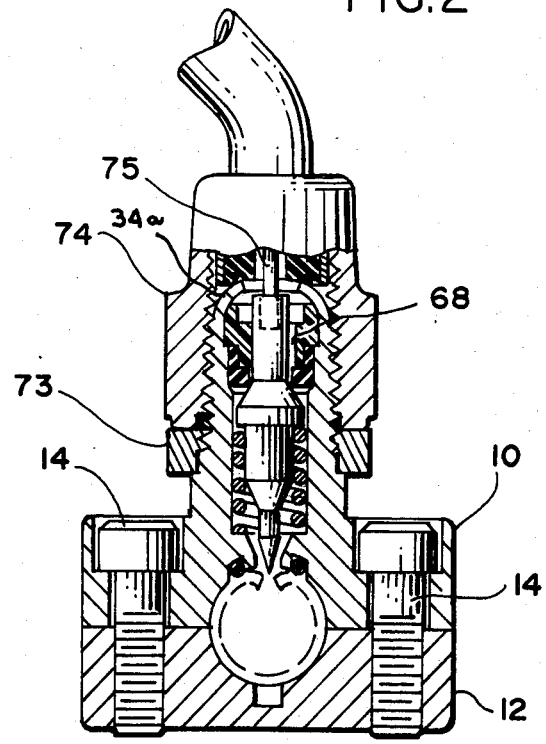
FIG. 4 is a vertical cross-sectional view similar to that of FIG. 3 but illustrating the depressor pin removed and the cap replaced by a charging hose fitting seated against a stop nut which prevents blockage of the pierced opening.

As illustrated in FIGS. 4 and 4a, the upper cylindrical bore portion 16a in the upper housing 10 has formed therein, in the surface surrounding the reduced-diameter cylindrical portion 28 opening into said bore portion, an annular recess 71. The inner bottom of the annular recess 71 is concentric with the transverse cylindrical bore 16 to provide seating for a rubber or neoprene "O"-ring 70. When fitted in place the "O"-ring 70 projects outwardly of its seat by the same distance about its periphery to press uniformly and thereby tightly seal against leakage of a clamped-in-place length of tubing to be pierced.

Figure 3:
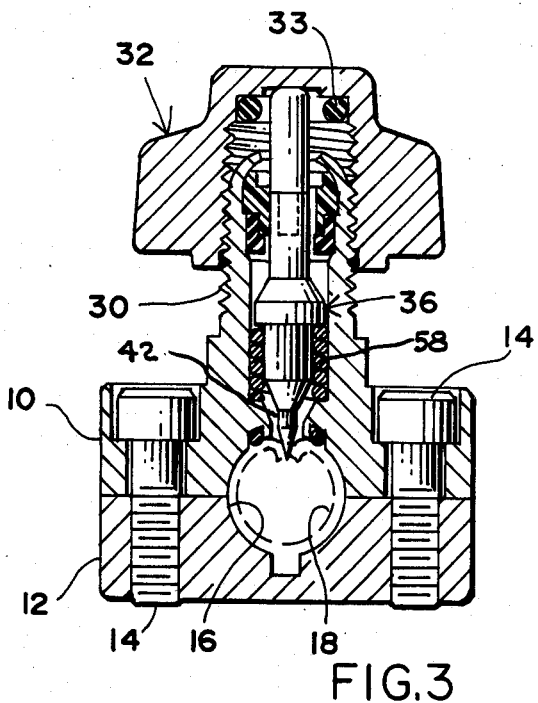
FIG. 3 is a vertical cross-sectional view similar to that of FIG. 2 but illustrating the operation of the depressor pin in forcing the piercing needle through the conduit to be tapped upon screw-threading the cap in place.

In use, the line piercing valve assembly will first be set in place at the desired location along a length of tubing 18 to be tapped, as illustrated in FIGS. 1 and 2, after which the cylindrical depressor pin 56 will be screw-threaded within the upper end of the piercing needle and valve member 36, (see FIG. 6). The internally-threaded screw cap 32 will then be threaded in place upon the externally threaded upper end portion of the central, cylindrical projection 20 of the upper housing 10, whereupon the recessed internal bottom wall 72 of said cap will abuttingly contact the upper end of the depressor pin 56, so as to depress piercing needle and valve member 36 downwardly against the urging of helical compression spring 58. Before the cap is fully threaded in place, the piercing needle portion 42 of the piercing needle and valve member will have pierced through the embraced length of tubing 18 as shown in FIG. 3. Thereafter, upon removal of the cap 32, the helical compression spring 58 yieldingly constrains the piercing needle and valve member 36 in an upward or outward direction so that its frusto-conical annular valve portion 48 seats against the annular valve seat 64 to prevent the escape of pressurized gas in a thus-tapped length of tubing. To offer additional protection against the escape of pressurized gas from a pierced length of tubing, the thumb-screw cap 32 is fitted at the bottom of its internally-threaded recess, with an "O"-ring 33 that seats in sealing engagement about the outer periphery of the thin-wall section of turned over portion 34a, (see FIG. 4).

FIGS. 6a and 6b illustrate a modification of the invention wherein, instead of the cylindrical depressor pin being screw-threaded within the upper end of the piercing needle and valve member 36, it is slide fitted therein. Thus, as illustrated in FIG. 6a, the cylindrical depressor pin 56a has a smooth, unthreaded, reduced-diameter lower end portion 54a, which can be slidingly received within coaxial, cylindrical recess 52a, formed in the upper end of piercing needle and valve member 36a, (see FIG. 6b). With this embodiment of the invention, to effect a piercing operation it is only necessary to slide-fit cylindrical depressor pin 56a into the upper end of the piercing needle and valve member 36a to enable sufficient downward movement thereof for piercing upon screwing screw cap 32 in place as described above.

As illustrated in FIG. 4, a standard charging hose fitting 74 of gauge-set having a depressor pin 75 similar to but smaller in diameter and length than depressor pin 56 may readily be threaded upon upper housing cylindrical projection 20 for pressurizing, depressurizing, charging, checking or other such functions with respect to the pierced length of tubing 18 and its contents.

As further illustrated in FIG. 4, an internally-threaded, annular stop nut or ring 73 may be seated down upon the central, cylindrical projection 20 to prevent any excessive downward movement of the piercing needle and valve assembly 36 upon screw-threading in place a charging hose fitting or the like, thereby obviating the possibility of the piercing needle being depressed even partially within the previously pierced tubing opening and thus restricting the flow of gas or liquid.

While I have illustrated and described herein only two basic forms in which my invention can conveniently be embodied in practice, it is to be understood that these embodiments are presented by way of example only and not in a limiting sense. The invention, in brief, comprises all the embodiments and modifications coming within the scope and spirit of the following claims.

What I claim as new and desire to secure by Letters Patent is:

1. In a line piercing valve assembly of the type having upper and lower housing portions removeably secured to one another to define therebetween a transverse cylindrical bore for the reception of a length of tubing to be pierced, wherein the upper housing portion is integrally formed with a cylindrical projection defining a concentric interior recess having a longitudinally symmetrical piercing needle and valve member disposed therewithin for coaxial movement therealong depressable into said bore, and further including spring means urging the piercing needle and valve member away from the bore into sealing contact with an annular valve seat secured within the interior recess near the outer end thereof, and further including a sealing cap threadedly engageable over the outer end of the cylindrical projection in closing relation with respect to the interior recess thereof, and further including removeable means cooperative with the sealing cap for depressing the piercing needle and valve member axially toward the transverse bore to pierce a length of tubing received in the transverse bore upon threaded advancement of the sealing cap; the improvement comprising, a depressor pin, means for removeably securing said depressor pin in coaxial relation upon the outer end of the piercing needle and valve member, the sealing cap having an interior wall portion abuttingly engageable with the outer end of said depressor pin for depressing said piercing needle and valve member upon the threaded advancement of the sealing cap, said means for removeably securing said depressor pin in coaxial relation upon the outer end of the piercing needle and valve member comprising a coaxial, internally-threaded, cylindrical recess in said outer end of said piercing needle and valve member, said depressor pin having an externally-threaded lower end portion threadedly engageable within said internally-threaded recess, and an internally-threaded annular stop ring threadedly receivable about the outer end of the cylindrical projection, said stop ring serving to limit downward movement of the piercing needle and valve assembly upon the screw-threading in place of a charging hose fitting or the like.

* * * * *